Mar. 6, 1923.

S. C. RAZEY ET AL
THRASHER
Filed Jan. 8, 1920

Inventor
S.C.Razey
P.M.Elliott.

By Randolph Jr. Atty

Patented Mar. 6, 1923.

1,447,887

UNITED STATES PATENT OFFICE.

SILAS C. RAZEY AND PHILIP M. ELLIOTT, OF ANTHONY, KANSAS.

THRASHER.

Application filed January 8, 1920. Serial No. 350,090.

*To all whom it may concern:*

Be it known that we, SILAS C. RAZEY and PHILIP M. ELLIOTT, citizens of the United States, residing at Anthony, in the county of Harper and State of Kansas, have invented certain new and useful Improvements in Thrashers; and we do hereby declare the following to be a full, clear, and exact description of the invention, such as will enable others skilled in the art to which it appertains to make and use the same.

This invention relates to an improved harvester and thrasher and one object of the invention is to provide a machine so constructed so that the heads may be cut from the standing grain and the grain then threshed out as the machine moves across a field, the major portion of the straw being left standing in the field and the straw and heads from which the grain has been removed passed out through the bottom of the machine onto the ground where they may be plowed under together with the standing straw.

Another object of the invention is to provide an improved type of grain separator or screening mechanism for separating the grain chaff and other trash which may feed into the machine with the grain.

This invention is illustrated in the accompanying drawings wherein

Figure 1:
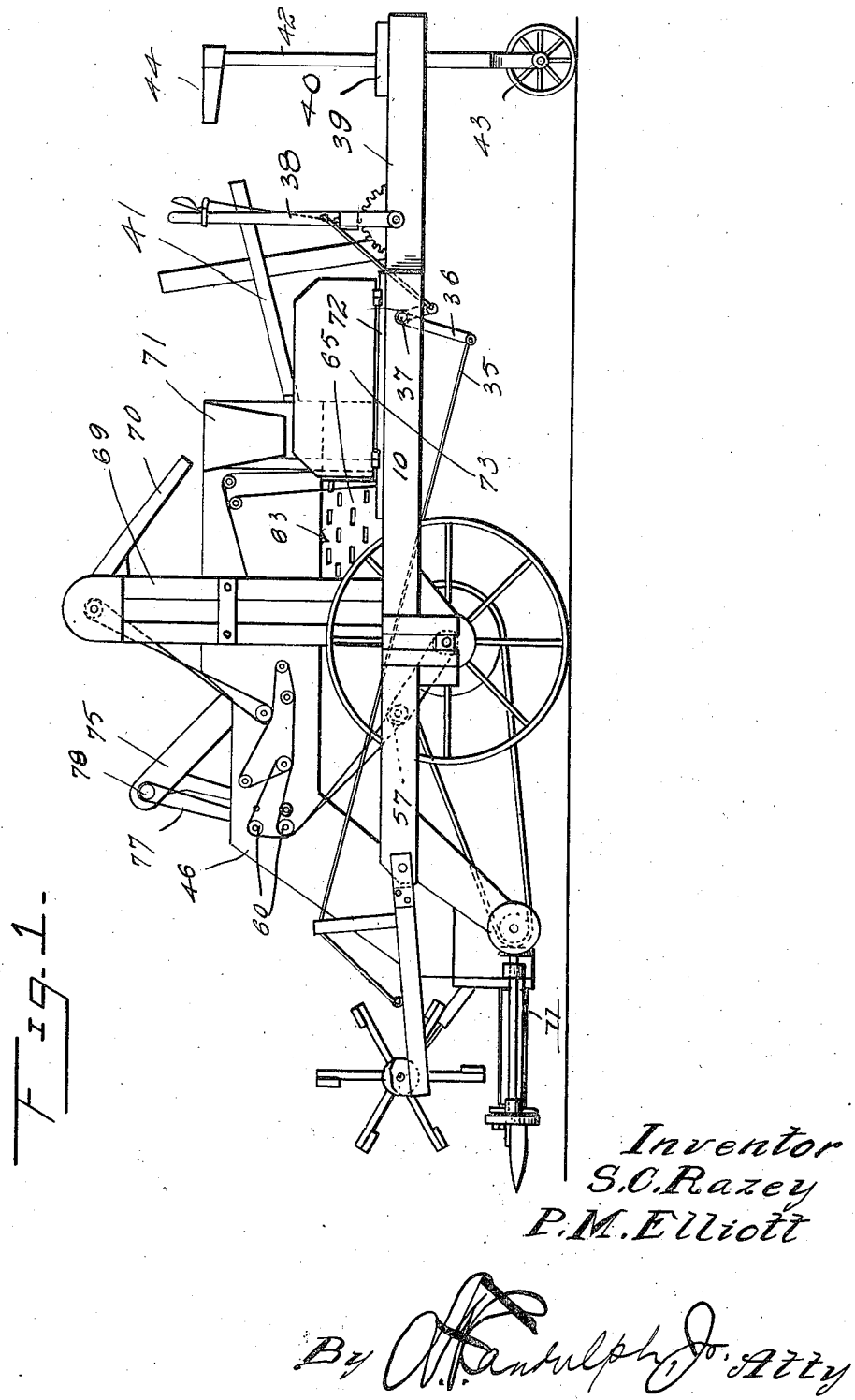
Figure 1 is a side elevation of the improved machine.
Figure 2:
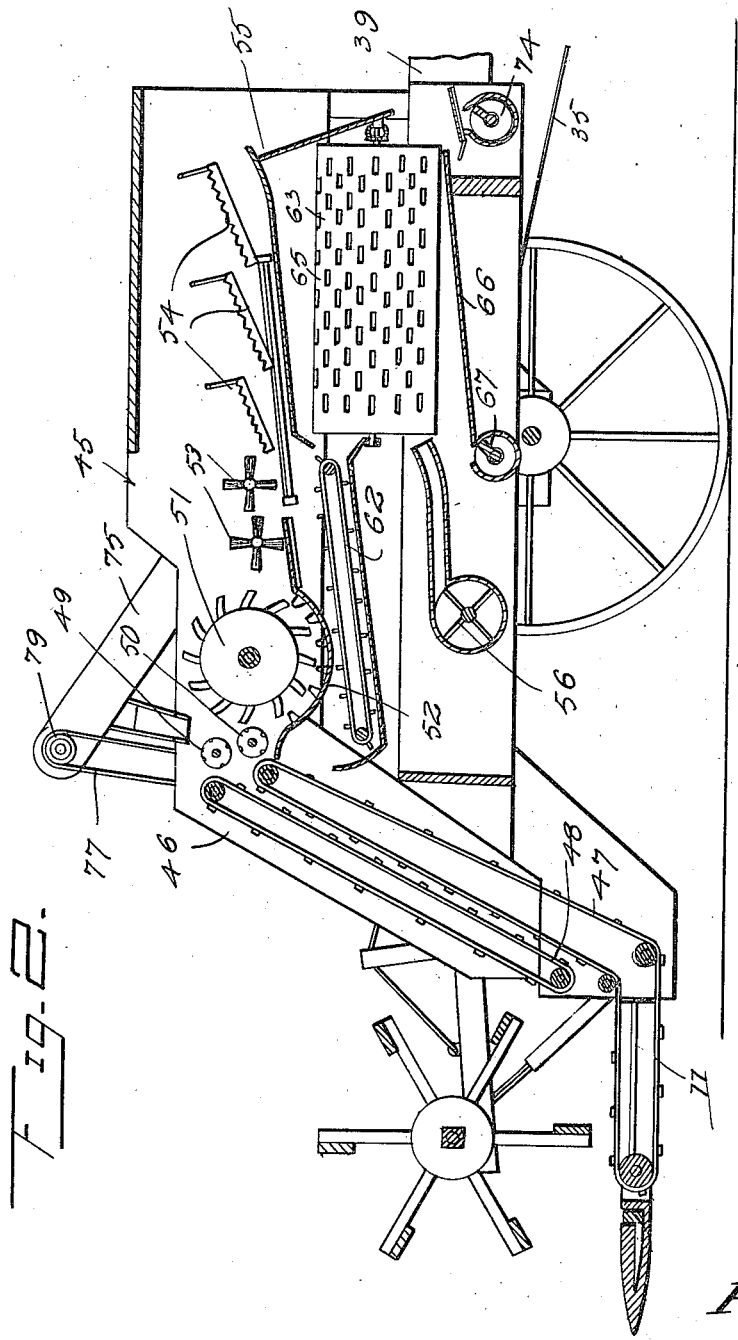
Figure 2 is a longitudinally extending vertical section through the machine.
Figure 3:
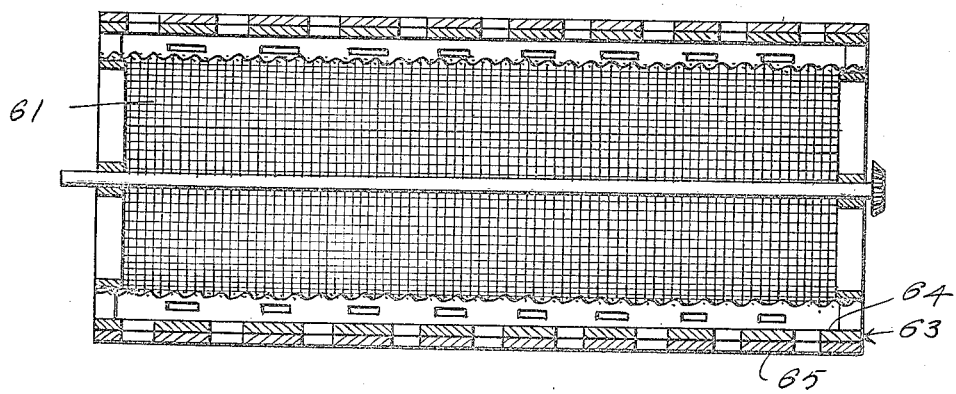
Figure 3 is an enlarged longitudinal section through the separator.
Figure 4:
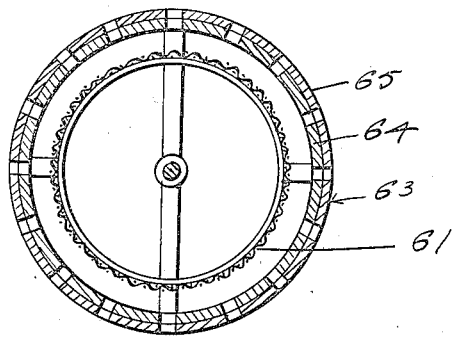
Figure 4 is a transverse sectional view through the separator.
Figure 5:
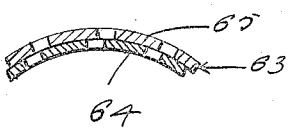
Figure 5 is a fragmentary sectional view showing the separator in an adjusted position.

This machine is provided with a suitable wheeled frame 10 at the forward end of which a conventional grain cutting and cultivating mechanism 11 is employed which may include feeding conveyors 47 and 48 extending parallel to each other with the former extending above the latter.

Said conveyors will carry the grain rearwardly until the grain passes between the upper flight of the conveyor 47 and the lower or inner flight of the conveyor 48. The grain will then be carried upwardly of the conveyor frame 47 and upon reaching the top of this conveyor will be engaged by and passed between the spiral rollers 49 and 50. These rollers 49 and 50 serve to feed the grain into the body or housing in operative relation to the cylinder 51 which cylinder is of a conventional construction and positioned above the usual concave 52. The usual beater 53 and straw rack 54 are provided in this machine, the straw rack extending rearwardly of the machine and communicating with a downwardly extending chute 55 which terminates at the bottom of the machine so that the straw may be deposited upon the ground. The usual fan 56 is also provided and located in the lower portion of the housing near the forward end thereof so that an air blast can be directed upwardly and rearwardly for removing chaff and other fine refuse from the grain. This fan has its shaft extending through one side of the housing and provided with a pulley wheel 57 about which passes a belt 58 which belt passes about a pulley wheel mounted upon the shaft carrying the ground wheels. The opposite end portion of the fan shaft also extends through the housing and carries a pulley about which passes a belt 59 which belt passes about pulley wheels 60 carried by the extended ends of the shafts for the spiral rollers 49 and 50 and is further passed about a pulley carried by the extended end portion of the cylinder shaft.

The separator for separating the chaff and refuse from the grain is provided with a cylindrical screen 61 which is rotatably mounted within the frame or body to the rear of the endless conveyor 62 and provided with openings which will allow the grain and smaller chaff and refuse to pass through but will detain the larger refuse and chaff, such as grain heads and cause this refuse to pass out the open rear end of the screen. After passing through the openings of the screen 61, the grain and smaller chaff will drop into the cylindrical separator which is positioned about the screen 61. This separator is indicated in general by the numeral 63 and is provided with inner and outer cylinders 64 and 65 which are provided with openings positioned to register. By proper adjustment of the two cylinders the size of the openings may be regulated thus permitting grain of a certain size to pass through but preventing chaff and larger refuse from passing through. It will thus be seen that only grain of a desired size will pass through the separator cylinders. This grain will drop down upon the incline 66 and the clean grain will feed down this incline to screw conveyor 67 extending transversely of the frame and communicating with the endless conveyor 68 which is mounted in a vertically extending housing 69. This conveyor 68 carries the grain upwardly and deposits the same into the chute 70 down which the grain passes into the measure 71. The sacks to be filled with the grain will be placed upon the platform 72 and when the measure is filled the grain may be emptied into a sack placed upon the platform. After the sack has been filled a new one can be put in place and the filled sack drawn to one side and slid down the incline 73. This incline or board 73 is hingedly connected with the platform and may be swung to a raised position or to an inclined position as desired.

A screw conveyor 74 is positioned transversely of the frame or housing to the rear of the separator and receives the chaff so that this chaff may be carried to the inclined conveyor housing 75 through which it will be carried by the endless conveyor 76 operated through the medium of the belt 77 which passes about the pulley 78 and about the pulley 79 by the shaft of the roller 49. This chaff will be deposited in the chute 80 which will return the chaff to the threshing cylinder thus permitting the chaff to be again passed through the machine and any grain contained therein recovered. It will thus be seen that there has been provided a harvesting and threshing machine which will be very compact in its construction and very efficient in operation.

What is claimed is:—

A thrasher having thrasher mechanism including a cylinder, said cylinder having a sieve, a pan opposite one end of the cylinder, a chute for straw opposite the other end of the cylinder, said cylinder having a rotatable shaft supported by said pan and chute, a perforated separator carried by said cylinder in spaced relation to said sieve, a perforated separator frictionally disposed about the first separator and axially adjustable relatively thereto to vary the extent of opening of the perforations of the separators, a fan to direct air blasts intermediate said sieve and separators, and inclined below said separators, a grain conveyor adjacent one end of said cylinder and to which said incline leads, a chaff conveyor adjacent the opposite end of the cylinder to said grain conveyor, said chute being disposed over and inclined relatively to the chaff conveyor to discharge straw beyond the chaff conveyor, and said chute and chaff conveyor being spaced apart to avoid obstruction to air blasts from the fan.

In testimony whereof we affix our signatures in presence of two witnesses.

SILAS C. RAZEY.
PHILIP M. ELLIOTT.

Witnesses:
W. B. JOHNSON,
MARIE ELLIOTT.